June 3, 1941.      L. C. ELDRIDGE      2,244,292
METER CLEANER
Filed Nov. 18, 1939      2 Sheets-Sheet 1
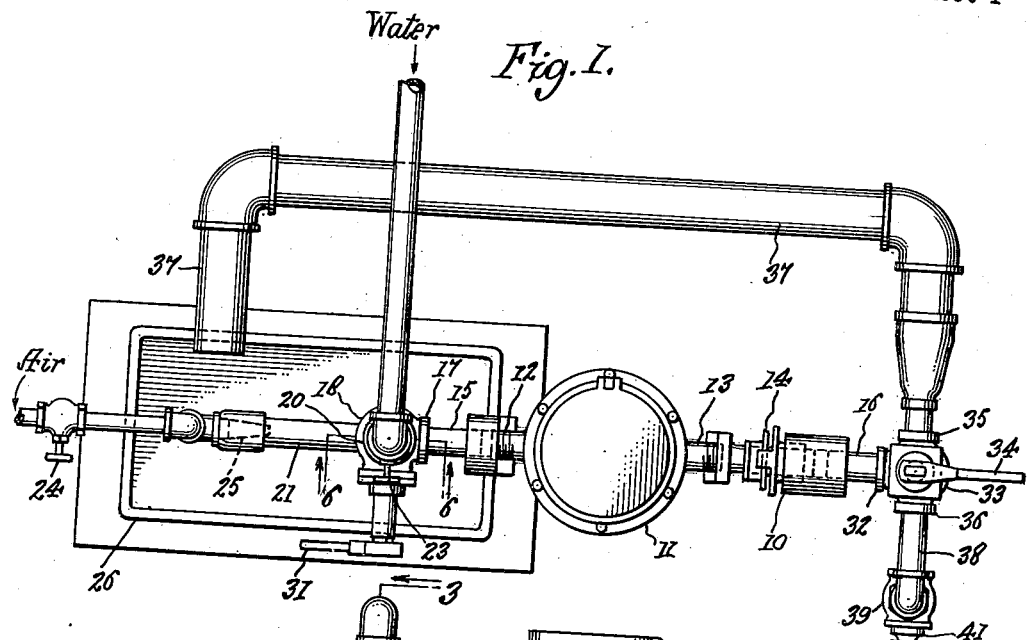
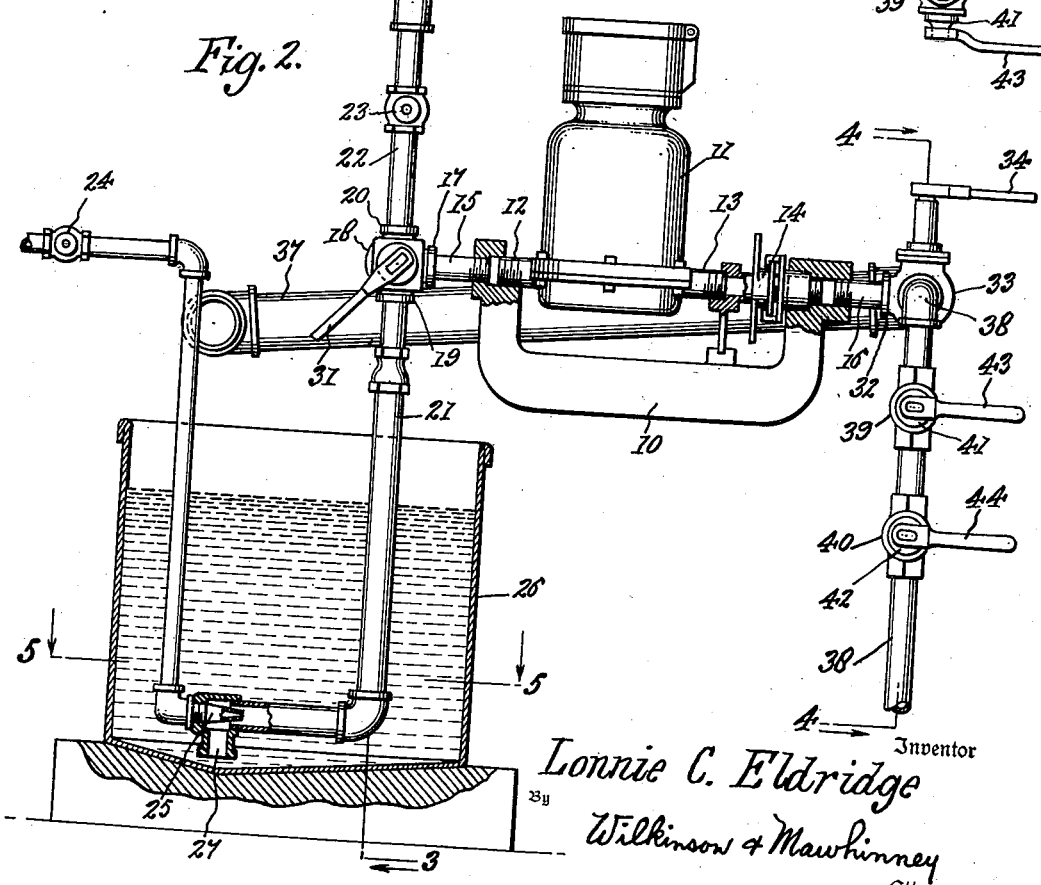
Inventor
Lonnie C. Eldridge
By Wilkinson & Mawhinney
Attorneys.

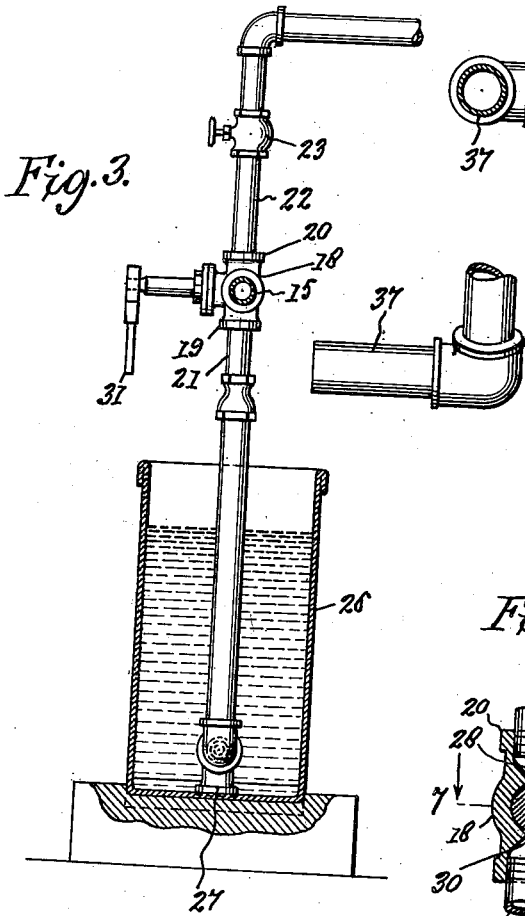
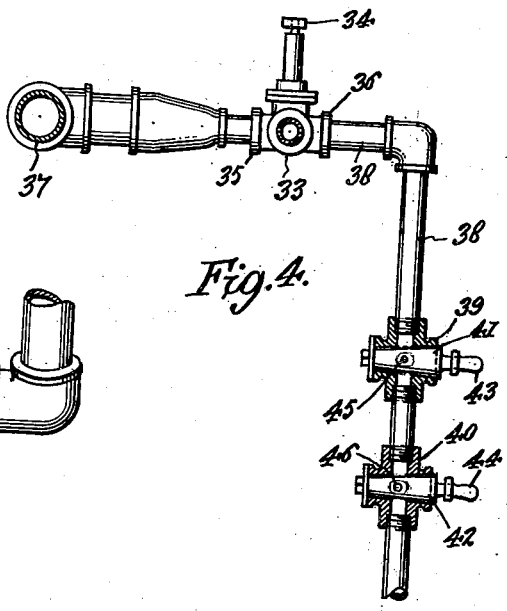
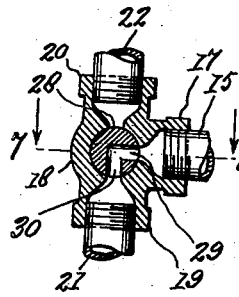
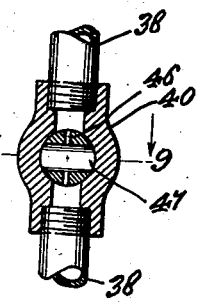
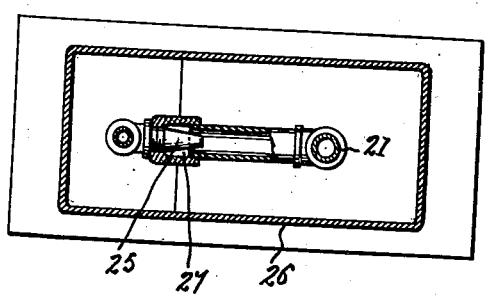
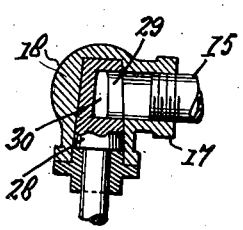
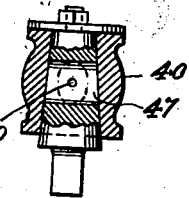

Patented June 3, 1941

2,244,292

UNITED STATES PATENT OFFICE 2,244,292

METER CLEANER

Lonnie C. Eldridge, Baton Rouge, La., assignor to Baton Rouge Water Works Company, Baton Rouge, La., a corporation of Louisiana Application November 18, 1939, Serial No. 305,207

5 Claims. (Cl. 141—1)

The present invention relates to improvements in meter cleaners and more particularly to a cleaning device and system for the cleaning of water meters and the like.

An object of the invention is to reduce the time element involved in the cleaning and restoration to duty of water meters, and to this end the improved system and method involves the cleaning of the internal parts of the meter without requiring the disassembly of the meter or the taking of the meter apart.

Another object of the invention resides in improving the method of cleaning water meters in that the improved device and method proposes the cleaning of the meter while it is operating in precisely the same manner as if actually in service.

A further object of the invention resides in providing an improved device and method wherein all moving and contacting surfaces in the internal mechanism of the meter which are subject to corrosion, scale or deposits from contact with water are thoroughly cleaned.

A still further object of the invention is to accomplish the above described purposes in a simple and efficient manner with high conservation of cleansing material, provision being made for the recirculation of this cleansing material to a reservoir or supply container for repeated use.

The invention also contemplates the chemical and subsequent water cleansing of the meter, the latter step being accomplished simultaneously with test of the meter under actual service conditions.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a top plan view of an improved meter cleaner constructed in accordance with the present invention.

Figure 2 is a side elevation of the same, with parts broken away and parts shown in section.

Figure 3 is a vertical transverse section taken on the line 3—3 in Figure 2.

Figure 4 is a vertical section taken on the line 4—4 in Figure 2.

Figure 5 is a horizontal section taken on the line 5—5, also in Figure 2.

Figure 6 is a fragmentary vertical section taken on the line 6—6 in Figure 1.

Figure 7 is a horizontal section taken on the line 7—7 in Figure 6.

Figure 8 is a fragmentary vertical section through the water discharge illustrating one of the test valves, and Figure 9 is a horizontal section taken on the line 9—9 in Figure 8.

Referring more particularly to the drawings, 10 designates a yoke for supporting a water meter 11 of a conventional form having pipe nipples 12 and 13 projecting laterally from its base portion for inclusion in the water service line. These nipples 12 and 13 are also utilized to connect the water meter 11 in the cleansing line.

The water meter 11 is detachably held in the yoke 10 by a device generally indicated at 14 which forms no part of the present invention. In line with the nipples 12 and 13 are pipe sections 15 and 16 carried by the yoke 10.

Pipe section 15, as more particularly seen in Figure 6, connects with one branch 17, the horizontal branch, of a three-way valve casing 18. The vertical branches 19 and 20 of valve casing 18 receive respectively the vertical pipes 21 and 22 which respectively lead to sources of cleansing fluid and water supply. The pipe 22 has a valve 23 therein for controlling the flow of water to the valve casing 18.

The pipe 21 communicates with a source of air supply under pressure, the air being admitted under the control of a valve 24 and included in the pipe 21 is an air injector 25 in communication with a low point in the fluid body contained in the reservoir or supply container 26, such injector having a receiving mouth 27 for the chemical or other liquid in the container 26 projecting down to a very low point in such container for the purpose of drawing up the liquid irrespective of the liquid level.

In the casing 18 is a valve 28 having right angled ports 29 and 30 communicating with each other. This valve is capable of being rotated, as by an external handle 31, to cause the valve to assume the position shown in Figure 6 where the cleansing fluid may be admitted through pipes 21 and 15 to the meter 11; or to a position in which the port 29 communicates with the upper branch 20 and the water pipe 22 with the port 30 communicating with the horizontal branch 17 and the pipe section 15.

The pipe section 16 at the opposite side of the meter connects with one branch 32 of a valve casing 33 similar to the valve casing 18 and having a valve therein similar to the valve 28 which is operable from the exterior of the casing 33 by a handle or instrument 34. The casing 33 has other branches 35 and 36 extending in alignment to connect with a return flow pipe 37 and a water discharge pipe 38. The pipe 37 slopes downwardly, as indicated in Figure 2, in order to carry the cleansing liquid back to the reservoir 26.

The water discharge pipe 38, as more particularly shown in Figure 4, has test valves 39 and 40 therein included in sequence, such valves consisting of tapered plugs 41 and 42 operable externally by handles 43 and 44 whereby the plugs may be opened and closed independently, such plugs 41 and 42 having openings or ports 45 and 46 of differential diameters, the lower plug 42 having the larger diameter.

In the use of the device, the valve 18 is turned with its plug 28 in the position indicated in Figure 6, while the valve 33 is positioned so as to place the pipe section 16 and the return flow pipe 37 in communication. The valve 24 is then opened and air under pressure admitted to the injector 25. Owing to the injector action, the cleansing fluid from the reservoir 26 is pulled in through the mouth 27 and circulated to the meter 11 through the pipe connections 15 and 12. Such chemical is circulated through the meter 11 in the identical manner in which water flows through the meter in service conditions, so that the meter is cleansed just as it is actually used. Therefore all the moving and contacting parts in the internal mechanism of the meter are thoroughly cleaned and all scale, deposit and corrosion removed rapidly, naturally and without taking the meter apart.

After the chemical or other liquid from the reservoir 26 is circulated through the meter 11 it passes out through the connections 13 and 16 and is diverted to the return flow pipe 37 by which it gravitates back to the reservoir 26. This liquid dripping back through the open overflow 37 will reveal to the operator the condition of the meter and the progress of the cleaning action.

After such action has gone on for a requisite time the air supply valve 24 is closed, the valve 18 is shifted so that the plug 28 closes off the pipe 21 and places the water connection 22 in communication with the meter 11. The water valve 23 is now opened and clean water is allowed to circulate through the meter. When the water emerges from the meter it passes through connections 13 and 16 and is diverted by the valve 33 to the water discharge 38, the valve 33 having been meantime shifted to shut off the return flow 37.

After water has been allowed to circulate through the meter for the requisite time to remove all of the chemical or cleansing fluid, the flow of water is continued for the purpose of testing the meter under actual conditions. This is accomplished by opening the lower plug 42 so that its large opening 47 is in communication with the water discharge 38. The top plug 42 is turned so that its restricted port 45 is in alignment with the discharge pipe 38 thus restricting the flow of the water to the diameter of the port 45. This allows only a very gentle flow of water through the meter so that a test of the meter's accuracy may be made. If the meter is sensitive to this small flow it is thoroughly cleaned. If not further cleaning may be indicated.

With the upper valve plug 41 wide open, the lower plug 42 may be turned, as indicated in Figure 8, so that its restricted port 46 extends in registry with the water outlet 38 in which case a slightly faster flow of water through the meter may be had owing to the increase in diameter of port 46 over the diameter of port 45. By the use of these two valves or test cocks 39 and 40 the restored condition of the meter may be accurately determined.

An appropriate cleaning solution, either acid, basic or neutral may be placed in the reservoir 26 or a solution containing grinding, abrasive or non-abrasive compounds may be used. This solution after circulating through the meter is returned to the container 26 for reuse many times over before being replaced or strengthened. The return of the fluid will eliminate waste of the cleaning compound and add to the economical operation of the device.

It is obvious that various changes and modifications may be made in the details of construction and design of the above specifically described embodiment of this invention without departing from the spirit thereof, such changes and modifications being restricted only by the scope of the following claims.

What is claimed is:

1. In a meter cleaner, a yoke having arms for supporting a meter by its inlet and outlet connections, pipe sections to said arms in communication with the inlet and outlet connections, three-way valves coupled to said pipe sections, fresh water and cleaning solution supply pipes to the three-way valve at the inlet side of the meter, said three-way valve having angle ports for setting up only alternately the communication with the inlet side of the meter of the water and cleaning fluid inlet supplies, cleaning fluid return and water discharge conduits to the three-way valve at the outlet side of the meter placed in communication with such outlet side of the meter only alternately by said three-way valve, and test cocks in said water discharge conduit.

2. In a meter cleaner, a yoke having arms for supporting a meter by its inlet and outlet connections, pipe sections to said arms in communication with the inlet and outlet connections, three-way valves coupled to said pipe sections, fresh water and cleaning solution supply pipes to the three-way valve at the inlet side of the meter, said three-way valve having angle ports for setting up only alternately the communication with the inlet side of the meter of the water and cleaning fluid inlet supplies, cleaning fluid return and water discharge conduits to the three-way valve at the outlet side of the meter placed in communication with such outlet side of the meter only alternately by said three-way valve, test cocks in said water discharge conduit, said test cocks being plural in number and extending in sequence and each having restricted and large ports at substantially right angles to one another, the restricted port of the test cock first in line being inferior in diameter to that of the restricted port in the next test cock.

3. In a meter cleaner, means for supporting a meter by its inlet and outlet connections, means communicating with the inlet and outlet connections, multi-way valves coupled to said communicating means, water and cleaning solution supply means to the multi-way valve at the inlet side of the meter, said multi-way valve having angle ports or setting up only alternately the communication with the inlet side of the meter of the water and cleaning solution inlet supplies, cleaning solution return and water discharge conduits to the multi-way valve at the outlet side of the meter placed in communication with such outlet side of the meter only alternately by said multi-way valve, and test means in said water discharge conduit.

4. In a meter cleaner, means for supporting a meter by its inlet and outlet connections, communicating means on said supporting means to the inlet and outlet connections, multi-way valves coupled to said communicating means, fresh water and cleaning solution supply pipes to the multi-way valve at the inlet side of the meter, said multi-way valve having angle ports for setting up only alternately the communication with the inlet side of meter of the water and cleaning fluid inlet supplies, cleaning fluid return and water discharge conduits to the multi-way valve in the outlet side of the meter placed in communication with such outlet side of the meter only alternately by said multi-way valve, testing means in said water discharge conduit, said testing means being plural in number and extending in sequence and each having restricted and large ports at substantially right angles to one another, the first restricted port of the testing means being inferior in diameter to that of the restricted port in the next testing means.

5. In meter cleaner, a water supply to the inlet of the meter, means for controlling the flow of water to said meter, a water discharge to the outlet of the meter, and testing means in said water discharge, said testing means being plural in number and extending in sequence and each having restricted and large ports at substantially right angles to one another, the restricted port of the testing means first in line being inferior in diameter to that of the restricted port in the next testing means.

LONNIE C. ELDRIDGE.